(12) United States Patent
Das et al.

(10) Patent No.: US 12,475,705 B2
(45) Date of Patent: Nov. 18, 2025

(54) SPATIAL-TEMPORAL ANOMALY AND EVENT DETECTION USING NIGHT VISION SENSORS

(71) Applicant: SRI International, Menlo Park, CA (US)

(72) Inventors: Subhodev Das, Princeton, NJ (US); Ajay Divakaran, Monmouth Junction, NJ (US); Ali Chaudhry, Princeton Junction, NJ (US); Julia Kruk, Rego Park, NY (US); Bo Dong, Chatham, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 18/331,007

(22) Filed: Jun. 7, 2023

(65) Prior Publication Data

US 2024/0212350 A1    Jun. 27, 2024

Related U.S. Application Data

(60) Provisional application No. 63/349,854, filed on Jun. 7, 2022.

(51) Int. Cl.
*G06V 20/40* (2022.01)
*G06V 10/44* (2022.01)
*H04N 23/21* (2023.01)

(52) U.S. Cl.
CPC .............. *G06V 20/44* (2022.01); *G06V 10/44* (2022.01); *H04N 23/21* (2023.01)

(58) Field of Classification Search
CPC ......... G06V 20/44; G06V 10/44; H04N 23/21
See application file for complete search history.

(56) References Cited

U.S. PATENT DOCUMENTS

| 10,228,996 B2 | 3/2019 | Sasturkar et al. |
| 10,268,931 B2 | 4/2019 | Shafer et al. |
| 10,698,757 B2 | 6/2020 | Sasturkar et al. |

(Continued)

FOREIGN PATENT DOCUMENTS

WO    WO-2020206487 A1 * 10/2020    ............. H04N 7/155

OTHER PUBLICATIONS

Caron et al., "Emerging Properties in Self-Supervised Vision Transformers", arXiv:2104.14294, May 24, 2021, 21 pp.

*Primary Examiner* — Richard A Hansell, Jr.
(74) *Attorney, Agent, or Firm* — Shumaker & Sieffert, P.A.

(57) ABSTRACT

In general, the disclosure describes techniques for joint spatiotemporal Artificial Intelligence (AI) models that can encompass multiple space and time resolutions through self-supervised learning. In an example, a method includes for each of a plurality of multimodal data, generating, by a computing system, using a first machine learning model, a respective modality feature vector representative of content of the multimodal data, wherein each of the generated modality feature vectors has a different modality; processing, by the computing system, each of generated modality feature vectors with a second machine learning model comprising an encoder model to generate event data comprising a plurality of events and/or activities of interest; and analyzing, by the computing system, the event data to generate anomaly data indicative of detected anomalies in the multimodal data.

16 Claims, 4 Drawing Sheets

(56) References Cited

U.S. PATENT DOCUMENTS

| | | | |
|---|---|---|---|
| 10,701,394 B1 * | 6/2020 | Caballero | G06N 3/045 |
| 10,846,531 B2 | 11/2020 | Yang | |
| 10,853,937 B2 | 12/2020 | Niculescu-mizil et al. | |
| 11,025,653 B2 | 6/2021 | Faigon et al. | |
| 11,093,816 B2 | 8/2021 | Lu et al. | |
| 11,194,303 B2 | 12/2021 | Chen et al. | |
| 11,194,691 B2 | 12/2021 | Dherange et al. | |
| 11,200,427 B2 | 12/2021 | Periaswamy et al. | |
| 2009/0147238 A1 * | 6/2009 | Markov | G01J 3/2823 |
| | | | 356/3 |
| 2015/0363386 A1 * | 12/2015 | Song | G06F 16/36 |
| | | | 704/9 |
| 2017/0208080 A1 * | 7/2017 | Sakamoto | G06N 20/00 |
| 2019/0325342 A1 * | 10/2019 | Sikka | G06F 18/22 |
| 2019/0341025 A1 * | 11/2019 | Omote | G10L 25/30 |
| 2020/0134398 A1 * | 4/2020 | Kruk | G06V 30/40 |
| 2022/0004935 A1 * | 1/2022 | Lakshmanan | G06N 20/20 |
| 2022/0044105 A1 * | 2/2022 | Amrani | G06N 3/088 |
| 2022/0156636 A1 * | 5/2022 | Albrecht | G01C 13/002 |
| 2022/0309387 A1 * | 9/2022 | Rodriguez | H04L 9/3213 |
| 2023/0055636 A1 * | 2/2023 | Cheng | G06V 10/42 |
| 2023/0131675 A1 * | 4/2023 | Kunz | G16H 50/30 |
| | | | 382/128 |
| 2023/0281959 A1 * | 9/2023 | Hoshen | G06N 3/045 |
| | | | 382/225 |
| 2023/0343414 A1 * | 10/2023 | Vessere | G16B 30/00 |

* cited by examiner

SPATIAL-TEMPORAL ANOMALY AND EVENT DETECTION USING NIGHT VISION SENSORS

This application claims the benefit of U.S. Patent Application No. 63/349,854, filed Jun. 7, 2022, which is incorporated by reference herein in its entirety.

TECHNICAL FIELD

This disclosure is related to imaging systems, and more specifically to special-temporal anomaly and event detection using night vision sensors.

BACKGROUND

Modern night vision monitoring systems use multiple sensors to acquire information about the surrounding areas in which those systems operate. Computers analyze the sensor data from such multiple sensors to detect events of interest. Such sensor data may be organized in the form of one or more multidimensional datasets. But searching for useful information within the multidimensional dataset is a non-trivial task, especially if the volume of the sensor data is significant.

Rule-based classification systems to classify discrete sets of data are often difficult and expensive to maintain, and are often insufficient for tasks involving large, varying, and/or complex data sets. In some cases, rule-based classification systems may be prone to failure if faced with data that varies or changes. Conventional deep learning models require longer training times in exchange for more accurate classifications. Such models may also require large, curated datasets of widely available and feature rich data for training purposes. However, night vision data is typically feature limited.

SUMMARY

In general, the disclosure describes a machine learning system having a transformer-based joint spatiotemporal model that encompasses multiple space and time resolutions through self-supervised learning using a plurality of transformer attention heads. Transformer attention heads retain knowledge of typical event data, and such a model may consequently provide a significant improvement in performance over conventional deep learning models. The machine learning system derives multidimensional spatial-temporal embeddings of feature vectors extracted from multidimensional spatial-temporal data. The extracted spatiotemporal features become more part-centric and stable. The multidimensional spatial-temporal embeddings may include, but are not limited to, geography, weather, seasonal variations, and other characterizing features of data obtained by a plurality of night vision (NV) sensors. The multidimensional spatial-temporal embeddings may be used as input for the transformer-based model.

Multimodal embeddings, tracking semantic evolution of anomalies over space and time, are connected through a latent diffusion process whose scalability enables training of the model jointly over multiple spaces and times using the machine learning system. In absence of pre-trained transformer models, the training may be semi-supervised, utilizing unlabeled data of in-distribution class and adversarial examples together with labeled ones. Scalability of the latent diffusion process enables training of the model jointly over the multiple spaces and times.

The techniques may provide one or more technical advantages that realize at least one practical application. For example, the transformer attention heads of the model retain properties of various data modalities, e.g., geography, weather, seasonal variations, knowledge of typical events and activities of interest, thus providing a modularity that enables multimodality, scalability, and explainability. In some aspects, the machine learning system incorporates lifelong learning to continually identify new, unknown events and add these to the knowledge base incrementally.

The transformer-based model can be run on a variety of standard hardware platforms. However, high-performance Graphics Processing Units (GPUs) may enhance the speed and performance of the anomaly detection system by efficiently processing the multidimensional input data. The model can be tailored to hardware of various footprints, from high-end GPU servers to low Size, Weight, and Power (SWaP) edge devices.

In an example, a method includes, for each of a plurality of content of the multimodal data, generating, by a computing system, using a first machine learning model, a respective modality feature vector representative of content of the multimodal data, wherein each of the generated modality feature vectors has a different modality; processing, by the computing system, each of generated modality feature vectors with a second machine learning model to generate event data comprising a plurality of events and/or activities of interest; and analyzing, by the computing system, the event data to generate anomaly data indicative of detected anomalies in the multimodal data.

In an example, a computing system comprises: an input device configured to receive a plurality of multimodal data; processing circuitry and memory for executing a machine learning system, wherein the machine learning system is configured to generate, for each content of a plurality of multimodal data, using a first machine learning model, a corresponding modality feature vector representative of the data, wherein each of the generated modality feature vectors has a different, corresponding modality, process each of the generated modality feature vectors with a second machine learning model to generate event data comprising at least one of an event or an activity of interest and process the event data to generate anomaly data indicative of detected anomalies in the multimodal data; and an output device configured to output the generated anomaly data.

In an example, non-transitory computer-readable media comprises machine readable instructions for configuring processing circuitry to: for each of a plurality of content of the multimodal data, generate, using a first machine learning model, a respective modality feature vector representative of content of the multimodal data, wherein each of the generated modality feature vectors has a different modality; process, by the computing system, each of generated modality feature vectors with a second machine learning model to generate event data comprising a plurality of events and/or activities of interest; and analyze, by the computing system, the event data to generate anomaly data indicative of detected anomalies in the multimodal data.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
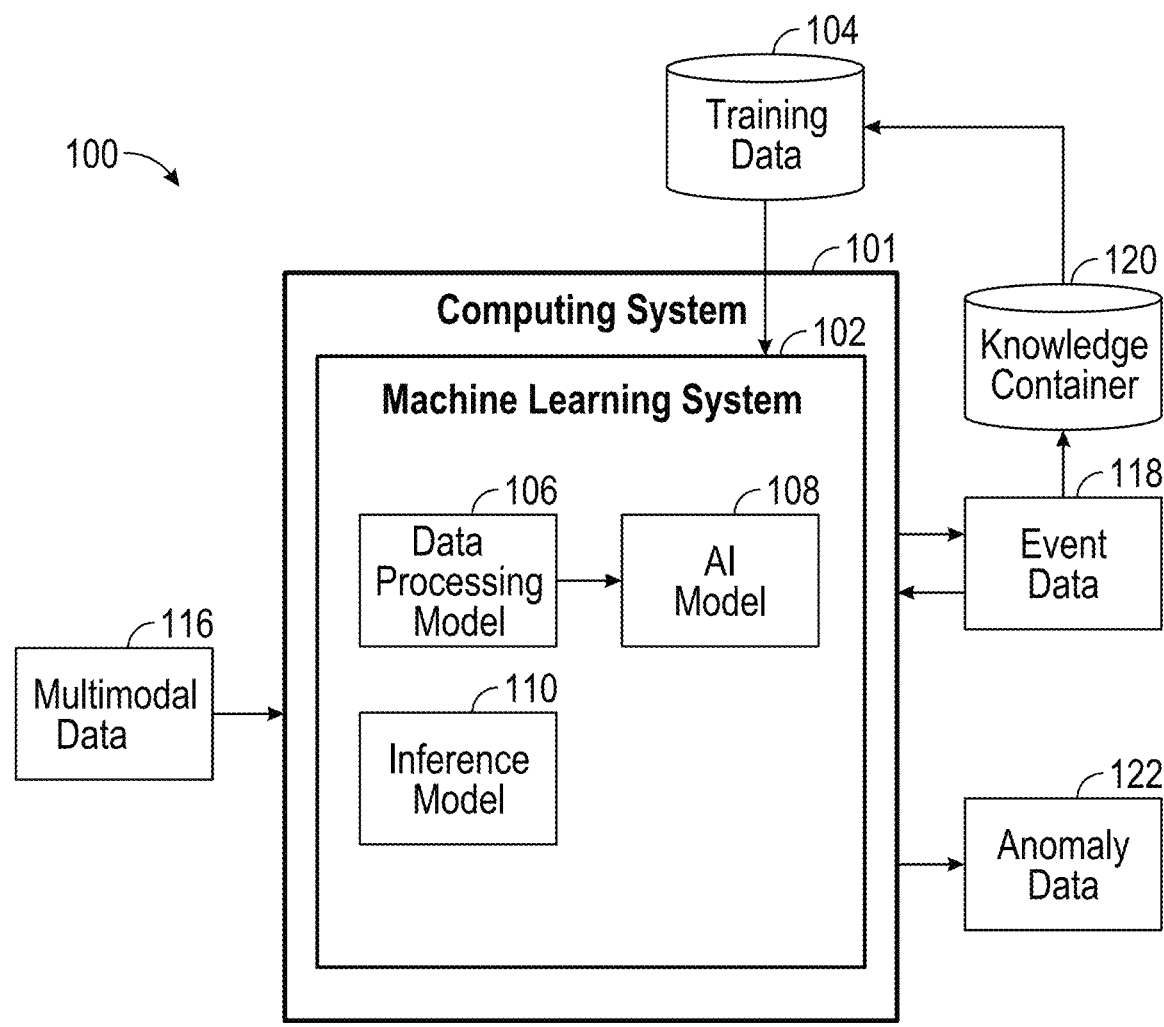
FIG. 1 is a block diagram illustrating an example system in accordance with the techniques of the disclosure.

FIG. 1 is a block diagram illustrating example system 100 in accordance with the techniques of the disclosure. As shown, system 100 includes computing system 101 and a knowledge container 120. Knowledge container 120 stores or represents respective domain knowledge models for one or more knowledge domains.

Computing system 101 may be implemented as any suitable computing system, such as one or more server computers, workstations, laptops, mainframes, appliances, cloud computing systems, High-Performance Computing (HPC) systems (i.e., supercomputing) and/or other computing systems that may be capable of performing operations and/or functions described in accordance with one or more aspects of the present disclosure. In some examples, computing system 101 may represent a cloud computing system, server farm, and/or server cluster (or portion thereof) that provides services to client devices and other devices or systems. In other examples, computing system 101 may represent or be implemented through one or more virtualized compute instances (e.g., virtual machines, containers, etc.) of a data center, cloud computing system, server farm, and/or server cluster.

Computing system 101 may utilize knowledge container 120 for the orderly storage and retrieval of various information. Different types of knowledge containers 120 may be used for different kinds of multimodal data 116. Knowledge containers 120 may represent and store both rich electronic content (such as events, documents, answers to questions, marketing materials, etc.) and other physical and electronic resources (such as experts, customers, online communities of interest, software applications, etc.). The types of knowledge containers 120 may include but are not limited to: document, question, answer, knowledge consumer, knowledge provider, e-resource and product knowledge containers.

Knowledge container 120 may be implemented as any suitable computing system, such as one or more server computers, workstations, laptops, mainframes, appliances, cloud computing systems, smart phones, tablet computers, and/or other computing systems that may be capable of performing operations and/or functions described in accordance with one or more aspects of the present disclosure. In some examples, knowledge container 120 may represent a cloud computing system, server farm, and/or server cluster (or portion thereof) that provides services to client devices and other devices or systems. In other examples, knowledge container 120 may represent or be implemented through one or more virtualized compute instances (e.g., virtual machines, containers) of a data center, cloud computing system, server farm, and/or server cluster.

Computing system 101 and knowledge container 120 may be the same computing system or different systems connected by a network. One or more networks connecting any of the systems of system 100 may be the internet or may include, be a part of, and/or represent any public or private communications network or other network. For instance, the network may each be a cellular, Wi-Fi®, ZigBee, Bluetooth® (or other personal area network—PAN), Near-Field Communication (NFC), ultrawideband, satellite, enterprise, service provider, and/or other type of network enabling transfer of data between computing systems, servers, and computing devices. One or more of client devices, server devices, or other devices may transmit and receive data, commands, control signals, and/or other information across the networks using any suitable communication techniques.

Computing system 101 executes machine learning system 102, which may be implemented as software, but may in some examples include any combination of hardware, firmware, and software. In accordance with techniques of this disclosure, machine learning system 102 may configured to perform continuous robust year-round anomaly detection stemming from events of interest. The disclosed method is robust against incomplete or locally irregular data and localized changes of frequencies of the events. In an aspect, machine learning system 102 may employ Deep Learning (DL) methodologies. DL is a machine learning method that employs mathematical models called neural networks. Neural networks may include large number of layers that attempt to mimic the human brain. In operation, DL attempts to extract complex hierarchal features and patterns present in large datasets. These features may then be merged together using neural networks to represent the model of the data.

Machine learning system 102 includes data processing model 106, AI model 108 and inference model 110. Machine learning system 102 may optionally train AI model 108. In an aspect, AI model 108 may be implemented as an auto-encoder model. In an aspect, the auto-encoder model may be a transformer-based model 108. Each of data processing model 106, AI model 108 and inference model 110 may represent a different machine learning model. In an aspect, inference model 110 may be configured to perform anomaly data inference, as discussed in greater detail below in conjunction with FIG. 4. Machine learning system 102 may receive trained data processing model 106, AI model 108, and inference model 110 for processing multimodal data according to techniques of this disclosure. That is, data processing model 106, AI model 108, and inference model 110 may be trained by another system and applied using machine learning system 102 of computing system 101.

Data processing model 106 may be configured to receive and process a plurality of multimodal data 116. The term "multimodal data" or "multimodal information" is used herein to refer to information that may be composed of a plurality of media or data types such as, but not limited to, video, audio, graphics, temperature, pressure and other sensor measurements. At least some of multimodal data 116 may be captured by one or more imaging device(s) (sensors) that may utilize night vision principles and may be operable in connection with an auxiliary light source or infrared radiation source to enhance the night vision capabilities of the imaging device. Multimodal data 116 may alternatively or additionally include geo-registered sensor data and geo-spatial overlay data from other sources, such as an existing mission data file, simulation databases, satellite imagery, aerial photography, and/or digitized maps. Multimodal data 116 may be obtained over time in a sequence of sampling events, which is referred to herein as the spatio-temporal dataset.

The different modalities of multimodal data 116 may form different images of different types representing the same or at least similar structural information. The term "modality of multimodal data" refers to the different modes of communication that are used to create multimodal data 116. These modes can include, but are not limited to, text, images, audio, video, and even interactivity. Each mode has its own unique way of communicating information, and when used together, the different modalities can create a more comprehensive description of the environment and/or events. For example, the first modality of the digital image may be an image that includes color information for each pixel to represent a scene, and the second modality of the digital image may include depth information for each pixel to represent the same scene.

Whereas machine learning system 102 may be configured specifically to be used with data received from mid-wavelength infrared ("MWIR") optical imaging systems in some examples, other examples of machine learning system 102 may be usable with many different systems. For example, machine learning system 102 may be configured to analyze Ultraviolet (UV), visible (VIS), near infrared (NIR), short-wave infrared (SWIR), mid infrared (MIR) wavelengths, long wave infrared wavelengths (LWIR), and some overlapping ranges. These correspond to wavelengths of approximately 180-380 nm (UV), 380-700 nm (VIS), 700-2500 nm (NIR), 850-1800 nm (SWIR), 650-1100 nm (MWIR), 400-1100 (VIS-NIR) and 1200-2450 (LWIR). As yet another non-limiting example, machine learning system 102 may be used in processing location information covering multiple geographical locations and time scales, among many other applications.

In an aspect, multimodal data 116 may include multidimensional spectral data. Multidimensional spectral data is a type of data that contains multiple spectra, each of which represents a different dimension. In some examples, sensors can be used to collect multidimensional spectral data by measuring the intensity of light at different wavelengths. In an aspect, multidimensional spectral data may include multi-resolution data in both space and time. Multi-resolution data in both space and time is a type of data that has different levels of detail in both the spatial and temporal dimensions. This type of data may be utilized by machine learning system 102 to study events that change over time and space. One common approach is to use sensors that collect data at different resolutions. For example, a satellite might collect images of the Earth's surface at different resolutions, with higher resolution images being collected over smaller areas.

In an aspect, the data processing model 106 may be a machine learning model and may be implemented to generate, for each of a plurality of multimodal data 116, a respective modality feature vector representative of corresponding multimodal data 116. For example, a first modality feature vector may represent a first modality feature of multimodal data 116. For example, if multimodal data 116 is an image with a caption, the first modality feature vector may represent a first modality (text) of multimodal data 116 (caption portion). A second modality feature vector may represent a second modality (image) of multimodal data 116.

It should be noted that various portions of multimodal data may have different imaging quality, resolution, background condition, illumination intensity and other conditions, and the obtained data are distributed differently. In addition, the data distribution may drift over time. In an aspect, to address the aforementioned challenges, machine learning system 102 may employ domain adaptation, domain generalization and perturbation invariance techniques. In an aspect, machine learning system 102 may apply domain generalizations to Out-Of-Distribution (OOD) samples. Considering a dog breed image classification task, for illustrative purposes only, the images of dogs would be in-distribution while images like bike, ball, etc. would be out-of-distribution.

In an aspect, machine learning system 102 may apply an AI model 108 to modality feature vectors to generate event data 118 based on the multimodal data 116. In other words, AI model 108 may process each of the generated modality feature vectors to generate event data 118 comprising at least one of an event or an activity of interest. In an aspect, at least a portion of event data 118 generated by AI model 108 may be stored in knowledge container. In an aspect, AI model 108 may be implemented based on a self-attention network (SAN). AI model 108 may be a neural machine. In an aspect, AI model 108 may be implemented as a transformer model. The transformer model may be based on the foregoing SAN and may be formed by stacking a plurality of layers of SANs.

Compared with a neural machine based on a recurrent neural network (RNN) in the related art, in some examples, the transformer model replaces the RNN with the SAN to model a dependency relationship between multimodal data 116. The RNN operates sequentially in a recurrent manner (that is, an output of each step is used as an input of a next step). However, the network training speed is low for the neural machine based on an RNN, and the recurrent structure of the RNN also increases the training difficulty.

In examples in which the AI model 108 includes layers, each of the layers may include a different set of artificial neurons. The layers can include an input layer, an output layer, and one or more hidden layers (which may also be referred to as intermediate layers). The layers may include fully connected layers, convolutional layers, pooling layers, and/or other types of layers. In a fully connected (or "dense") layer, the output of each neuron of a previous layer forms an input of each neuron of the fully connected layer. In a convolutional layer, each neuron of the convolutional layer processes input from neurons associated with the neuron's receptive field. Pooling layers combine the outputs of neuron clusters at one layer into a single neuron in the next layer. Each input of each artificial neuron in each of the layers may be associated with a corresponding weight, and artificial neurons may each apply an activation function known in the art, such as Rectified Linear Unit (ReLU), TanH, Sigmoid, etc.

In the example of FIG. 1, AI model 108 may be a transformer-based spatiotemporal model that processes time-varying spatial data as a linear combination of spatiotemporal sequences. Such spaciotemporal model may include a plurality of spatial resolutions and a plurality of temporal resolutions. In other words, AI model 108 may process data that has different levels of detail in both the spatial and temporal dimensions. In an aspect, AI model 108 may exploit, separately but simultaneously, both the spatial and the temporal regularities that exist in multimodal data 116. In an aspect, AI model 108 may analyze data sets describing the same physical properties (e.g., weather) and coming from different original datasets (e.g. numerical weather models and interpolation from weather station data) can be combined and aggregated, e.g. with different weights or other algorithms, to provide the best event data 118 for a given data analysis. In an aspect, a transformer-based AI model 108 may contain a number of attention layers, where each attention layer includes a number of attention heads, with each attention head performing a self-attention operation (also known as "an attention mechanism"). In some example self-attention operations, AI model 108 may compute an attention score for each embedding within a sequence of input embeddings (discussed in greater detail below) relative to all other embeddings within the sequence. AI model 108 may perform this process or operation a significant number of times. In an aspect, the attention layer may compute attention scores based on the pairwise dot product of input tokens. For example, there may be multiple such self-attention heads in a layer that operate on different projections of the input. In an aspect, attention heads of AI model 108 may retain properties of various data modalities. Such data modalities may include, but are not limited to, geography, weather, seasonal variations, knowledge of typical events and activities of interest, and the like. In an aspect, an intermediate layer of the transformer-based AI model 108 may include N transformer layers. Each of the N transformer layers may include corresponding attention mechanism.

In an aspect, inference model 110 may be configured to process event data 118 to generate anomaly data 122 indicative of detected anomalies in multimodal data 116. Inference model 110 may be configured to detect anomalies in real-time. In an aspect, inference model 110 may be a trained, unsupervised machine learning model, which allows an autonomous pre-selection of anomalies. Inference model 110 may be implemented as an auto-encoder by a neural network, in which case the classification may advantageously be performed according to a reconstruction error of the auto-encoder, as discussed below. The unsupervised model may be a multi-layer perceptron model yet implemented in a form of an auto-encoder by the neural network.

In an aspect, inference model 110 may be configured to classify event data 118. For example, for each event of generated event data 118, auto-encoder of inference model 118 may be fed with said each event data for the auto-encoder to reconstruct said event data according to one or more parameters learned by a cognitive algorithm of the auto-encoder. In an aspect, inference model 110 may score a degree of anomaly of said each event, according to a reconstruction error in reconstructing said each event, to obtain anomaly scores. This makes it possible to achieve very fast inferences. In an aspect, anomaly data 122 may include anomaly scores for corresponding events in event data 118.

In an aspect, machine learning system 102 may train AI model 108 and/or inference model 110 with training data 104. In practical application, the training data 104 of the anomaly detection system and the actual multimodal data 116 may have a significant differences, which requires that the anomaly detection system construct an effective prediction model under the condition that only the training data 104 of the source domain is known, but the test data of the target domain is unknown. Advantageously, machine learning system 102 may utilize an efficient training procedure to strengthen perturbation invariance.

In supervised learning, a machine learns to classify data using a technique for learning a function from training data 104. Training data 104 may include pairs of input objects (typically vectors), and desired outputs. The output of the function can predict a class label of the input object (called classification). The task of the supervised learner is to predict the value of the function for any valid input object after having seen a number of training examples (i.e., pairs of input and target output). These inputs are called the training set. To achieve this, the learner has to generalize from the presented data to unseen situations in a "reasonable" way.

Aspects of the disclosure may use supervised learning. That is, they may use labeled training data. However, for some data examples, the nominal label might not be certain. For example, a generated data example Y associated with a data example X with a known label A may be different enough from X that A is not the correct label for Y. Data examples that have been manually labeled may have been labeled incorrectly. There may be data examples that have been labeled automatically by some process such as semi-supervised learning.

In an aspect, a transformer-based AI model 108 pre-trained on ground-based data provided by Electro-Optical (EO) sensor(s) may be effectively fine-tuned for overhead infrared (IR) data through self-supervision, for example.

Figure 2:
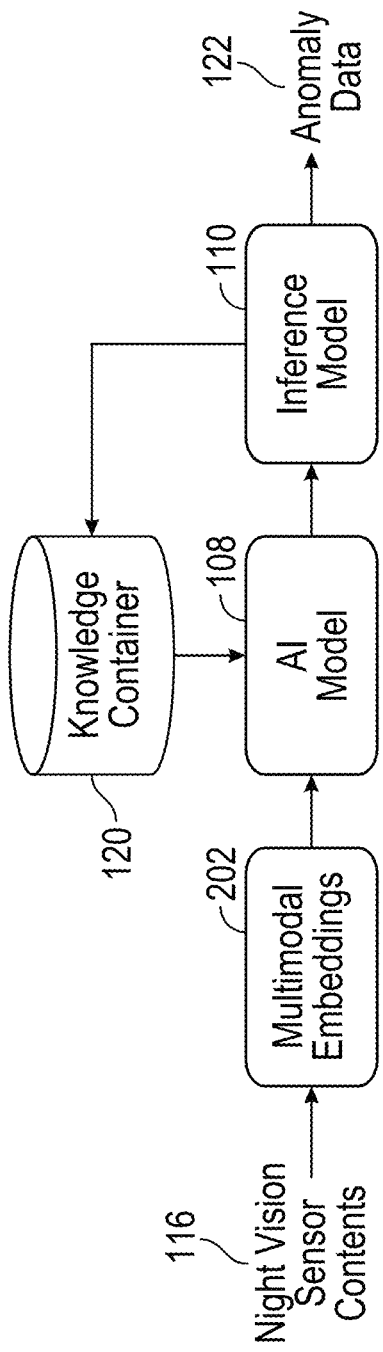
FIG. 2 is a block diagram illustrating spatial-temporal anomaly detection, according to techniques of this disclosure.

FIG. 2 is a block diagram illustrating spatial-temporal anomaly detection, according to techniques of this disclosure. The disclosed process provides a modularity that enables multimodality, scalability, and explainability. In an aspect, AI model 108 may have a transformer-based architecture.

In some aspects in accordance with the present principles, for each of a plurality of modalities of the multimodal data 116, data processing model 106 may generate a respective modality vector representative of the various modalities of the content of multimodal data 116. For example, for each of a plurality of images of multimodal data 116 received by data processing model 106 of FIG. 1, data processing model 106 may create a first modality feature vector representation of image content of the multimodal data 116 for embedding into AI model 108. In addition, for each of a plurality of weather data sets of multimodal data 116 received by data processing model 106 of FIG. 1, a respective, second modality feature vector representation of weather content of the multimodal data can be created by data processing model 106 for embedding into AI model 108. In accordance with the present principles, data processing model 106 may be configured for creating vector representations for any plurality of modalities of content and for content attributes. In an aspect, each of the generated modality feature vectors may be an embedding 202 for the different, corresponding modality.

In some examples, when integrating several embeddings 202 (e.g., activations from several layers), AI model 108 may use a feature bagging approach. In an aspect, multi-modal embeddings 202 disclosed herein may be a data structure used by AI model 108 to track semantic evolution of observation information over space and time.

As shown in FIG. 2, multimodal embeddings 202 may be input as features for AI model 108. In an aspect, each of AI model 108 and inference model 110 may be a latent variable model. A "latent variable model" may be a statistical model that relates or maps a set of observable variables to a set of latent variables. In an aspect, the latent variable model may be constructed or fitted using an autoencoder. As noted above, AI model 108 may have an autoencoder architecture. An "autoencoder" may be a type of artificial neural network used to learn efficient data codings in an unsupervised manner. An autoencoder architecture includes two parts, an encoder and a decoder. The encoder and decoder are independent from one another and may be swapped out with other encoders and decoders depending on the input data and the desired output. One form of an autoencoder may be a feedforward, non-recurrent neural network having an input layer, an output layer and one or more hidden layers connecting them, with the output layer having the same number of nodes as the input layer, and with the purpose of reconstructing its own inputs. Different types of autoencoders include, but are not limited to, variational autoencoders, sparse autoencoders, and K-sparse autoencoders.

Encoders may be provided for each modality. Each of the encoders may be configured as a fully convolutional dense network. Each of the encoders may include dense blocks of multiple convolutional layers. Early layers may be connected to the next ones within dense blocks. Max or Average Pooling layer may follow each dense block to further reduce the scale and advance in the abstract representation of the input data. The number of convolutional layers per dense block may vary depending on the complexity of the input data, as does the number of dense blocks in the encoder, or decoder. The last layer of the encoder defines the latent space, in which the representation of the data lays.

By introducing cross-attention layers into the model architecture, the disclosed diffusion-based AI model 108 becomes a flexible generator for general conditioning inputs such as text or bounding boxes and high-resolution synthesis of data becomes possible in a convolutional manner. Advantageously, latent diffusion models (LDMs) provide highly competitive performance on various tasks, including unconditional image generation, semantic scene synthesis, and super-resolution, while significantly reducing computational requirements compared to pixel-based DMs. Accordingly, multimodal embeddings 202 may be connected through a latent diffusion process whose scalability enables training of AI model 108 jointly over all spaces and times.

In an aspect, AI model 108 may employ many pattern recognition techniques including those that may classify input data into classes based on key features with the objective of recognizing patterns or regularities in data. In an aspect, the unsupervised learning classification algorithms may operate by finding hidden structures in unlabeled data using advanced analysis techniques such as segmentation and clustering. For example, some of the analysis techniques used in unsupervised learning may include K-means clustering, Gaussian mixture models, Hidden Markov models, and the like. In some environments, it may be possible to collect much more adversarial data samples of much higher variability, which leads to construction of better feature/decision spaces and finally to more accurate classification and lower level of false alarms. The training of AI model 108 may be semi-supervised, utilizing unlabeled data of in-distribution class and adversarial examples together with labeled ones. As shown in FIG. 2, training may use information stored in knowledge container 120.

Advantageously, the system illustrated in FIG. 2 may incorporate life-long learning to constantly identify non-obvious new, previously unknown events and add these events to knowledge container 120 incrementally. Most multimodal data 116 may have a time and date stamp associated with each unique event record. However, at least some multimodal data 116 may lack such information. In an aspect, transformer model 108 may use indirect means to infer a time and date (such as the arrival of an event between two other events which do have such a timestamp). The above operations can also be performed in other aspects by using data structures other than the ones listed here. In essence, every data structure that allows constant time lookup of the events coupled with any data structure that allows the retrieval of a given event's neighborhood, based on similarity of their features, can be used.

In an aspect, knowledge container 120 may include complex rules, correlations, link propagation maps, knowledge graphs, and fault trees discovered at each stage during model comprehensive training and evaluation. The incremental model training and evaluation may include a step of performing model parameter update, model retraining, and evaluation update operations on the existing operational maintenance model after new log data arrives. In other words, the disclosed system incorporates life-long learning to constantly identify new, unknown events and add these to knowledge container 120 incrementally.

In an aspect, a verification test set may be used to check the accuracy of the machine learning different algorithms. The verification test set may be a sample of data with statistically similar properties to training data 104 that can be used to check the ability of the machine learning algorithm to classify pattern that have not been previously used to train the algorithm. This ability to classify new patterns is called generalization. Two important characteristics of the verification set are the data not duplicate training examples and that it be statistically similar to training data 104. The testing and verification data sets should also be representative of as large a cross section of multimodal data 116 as possible so that the generalization achieved will allow AI model 108 to perform classification of the detected events as accurately as possible.

In an aspect, AI model 108 may employ domain-based learning. The domain-based learning may be based on image-level or region-level features. This may provide a richer set of concepts detecting which may improve the semantic understanding of the data. For example, AI model 108 may include a method for semantic event detection in digital image content records of multimodal data 116. Specifically, an event-level "Bag-of-Features" (BOF) representation may be used to model events, and generic semantic events may be detected in a concept(time) space instead of an original low-level visual feature space based on the BOF representation. In an aspect, an event-level representation may be developed where each event is modeled by a BOF feature vector based on which semantic event detectors are directly built. Assuming, for example, that the above-described dataset includes digital still images and video segments from various sensors, it may be desirable that the entire multimodal data 116 first be partitioned by AI model 108 into a set of macro-events, and each macro-event be further partitioned into a set of events. The partition may be based on the capture time of each digital still image of video segment and the color similarity between them, by using an event clustering algorithm, for example. Using the above-described semantic concept detectors, N concept detectors may be developed using low-level color, texture, and edge visual features over the applied dataset. The disclosed techniques may provide a roadmap for developing resilient DL models in which the model robustness is considered as an evaluative metric.

The latent variable inference model 110 may determine a distance of the new observation to the latent variable model, or in other words from the latent variable approximation. Based on the determined distance, inference model 110 may determine whether or not the new observation is an outlier (anomaly). The determination of whether or not the received new observation is an outlier may, for example, comprise determining whether the distance of the new observation to the latent variable model is greater than a threshold distance. If the calculated distance of the new observation is greater than the threshold distance, inference model 110 may determine that the new observation is an outlier. In other words, according to aspects of a present disclosure, a deviation of the reconstructed data from actual data serves as a measure of the anomaly.

In an aspect, if anomalies have been predefined into their own class, then the classification task also accomplishes anomaly detection. Alternatively, if all training classes correspond to only normal events, then inference model 110 may identify anomalies via outlier detection.

As a non-limiting example, normal samples are likely to exhibit a high level of sparsity, and conversely, anomalous samples likely produce a low sparsity index. Accordingly, inference model 110 may calculate a threshold which may determine whether or not the sample is anomalous. Unsupervised anomaly detection techniques detect anomalies in an unlabeled test data set under the assumption that the majority of the instances in the data set are normal by looking for instances that seem to fit least to the remainder of the data set. Supervised anomaly detection techniques require a data set that has been labeled as "normal" and "abnormal" and involves training a classifier. In other words, while detecting anomalies, it may be equally important for inference model 110 to simultaneously classify the entities belonging to the "normal" set.

In an aspect, inference model 110 may apply the following evaluation metrics: Known Set Accuracy (KSA), True Negative Rate (TNR) and Area Under ROC Curve (AUROC).

Accuracy is one of the metrics to describe the accuracy of an algorithm on a classification task. Accuracy is the number of samples that are paired divided by the number of samples. For example, if accuracy comes out to 91%, it means that 91 correct predictions out of 100 total examples. KSA evaluates the performance on the "normal" set. In an aspect, TNR may be defined by the following formula (1):

$$TNR(X)=1-Pr(X=\text{specific class given by the algorithm, given that the class is NOT the TRUTH}) \quad (1)$$

TNR @95% TPR (True Positive Rate) assures that the proposed approach maintains a high TPR (95%) while detecting the anomalies negatives. AUC measures the entire two-dimensional area underneath the entire ROC curve from (0,0) to (1,1). AUC provides an aggregate measure of performance across all possible classification thresholds. AUROC evaluates the sensitivity of the approach to the detection threshold.

Figure 3:
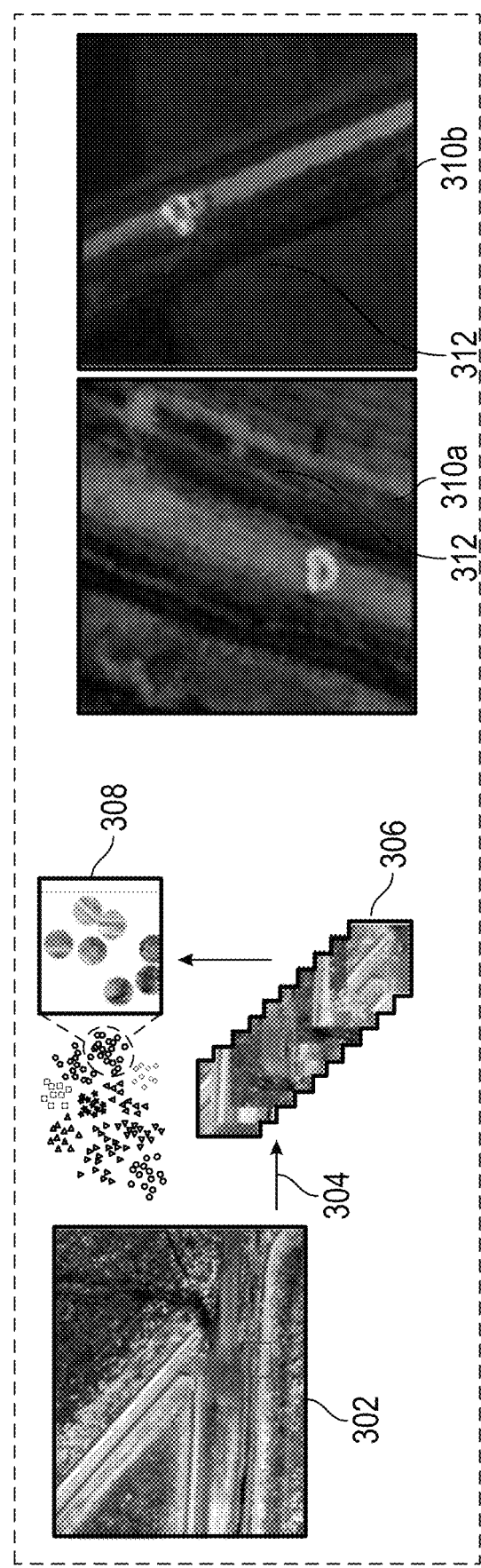
FIG. 3 shows results of anomaly detection using DINO (self-distillation with no labels), according to techniques of this disclosure.

FIG. 3 shows results of anomaly detection using DINO (self-distillation with no labels), according to techniques of this disclosure. DINO is a self-supervised learning method that directly predicts the output of a teacher network—built with a momentum encoder—by using a standard cross-entropy loss. The model passes two different random transformations of an input image to the student and teacher networks. Both networks have the same architecture but different parameters. The output of the teacher network is centered with a mean computed over the batch. Each networks outputs a dimensional feature that is normalized with a temperature softmax over the feature dimension. Their similarity is then measured with a cross-entropy loss. A stop-gradient (sg) operator is applied on the teacher to propagate gradients only through the student. The teacher parameters are updated with an exponential moving average (ema) of the student parameters.

FIG. 3 shows an annotated image 302 that may be part of multimodal data 116. In an aspect, data processing model 106 may process (304) annotated image 302 to generate a plurality of sub-images 306. Each sub-image may have multimodal data associated therewith, such as but not limited to, timestamp information, geolocation information, weather information, and the like, corresponding to different modes for the content. Based on the plurality of sub-images 306, data processing model 106 may generate multimodal embeddings 308. Multimodal embeddings 308 may be processed by AI model 108 and inference model 110 to perform anomaly detection, as described above. In an aspect, anomaly data 122 may include detected anomalous region 312 in output images 310a and 310b.

Figure 4:
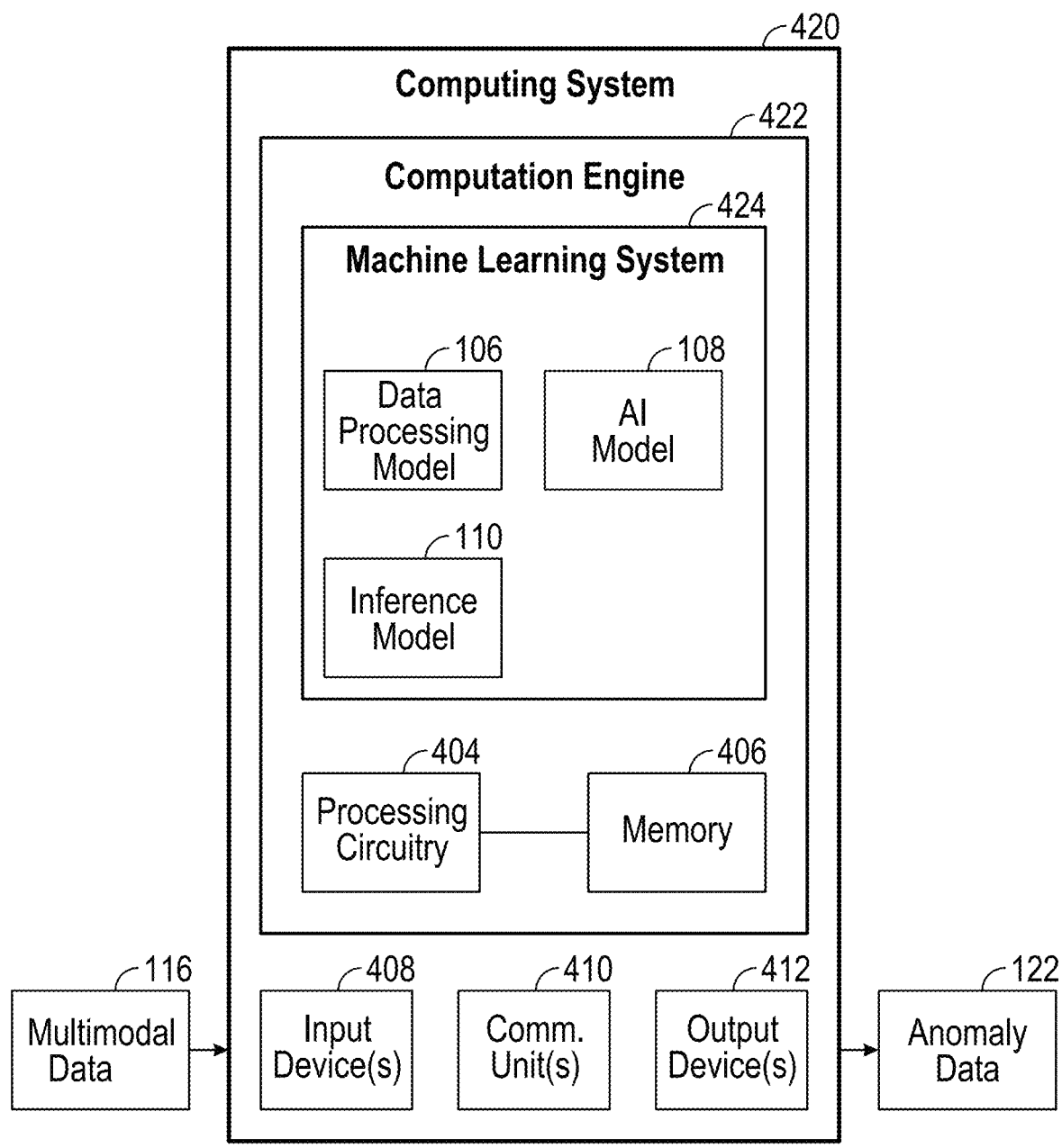
FIG. 4 is an example of a computing system, according to techniques of this disclosure.

FIG. 4 is an example of a computing system, according to techniques of this disclosure. Computing system 420 represents one or more computing devices configured for executing a machine learning system 424, which may represent an example instance of any machine learning system described in this disclosure, such as machine learning system 102 of FIG. 1.

Memory 406 may store information for processing during operation of computation engine 422. In some examples, memory 406 may include temporary memories, meaning that a primary purpose of the one or more storage devices is not long-term storage. Memory 406 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Memory 406, in some examples, also include one or more computer-readable storage media. Memory 406 may be configured to store larger amounts of information than volatile memory. Memory 406 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Memory 406 may store program instructions and/or data associated with one or more of the modules described in accordance with one or more aspects of this disclosure. Memory 406 may store weights for parameters for machine learning models, which in this example include data processing model 106, AI model 108 and inference model 110.

Processing circuitry 404 and memory 406 may provide an operating environment or platform for computation engine 422, which may be implemented as software, but may in some examples include any combination of hardware, firmware, and software. Processing circuitry 404 may execute instructions and memory 406 may store instructions and/or data of one or more modules. The combination of processing circuitry 404 and memory 406 may retrieve, store, and/or execute the instructions and/or data of one or more applications, modules, or software. Processing circuitry 404 and memory 406 may also be operably coupled to one or more other software and/or hardware components, including, but not limited to, one or more of the components illustrated in FIG. 4. Processing circuitry 404 and memory 406 may each be distributed over one or more computing devices.

Computation engine 422 may perform operations described using software, hardware, firmware, or a mixture of hardware, software, and firmware residing in and/or executing at computing system 420. Computation engine 422 may execute machine learning system 424 or other programs and modules with multiple processors or multiple devices. Computation engine 422 may execute machine learning system 424 or other programs and modules as a virtual machine or container executing on underlying hardware. One or more of such modules may execute as one or more services of an operating system or computing platform. One or more of such modules may execute as one or more executable programs at an application layer of a computing platform.

One or more input devices 408 of computing system 420 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 412 may generate, transmit, or process output. Examples of output are tactile, audio, visual, and/or video output. Output devices 412 may include a display, sound card, video graphics adapter card, speaker, presence-sensitive screen, one or more USB interfaces, video and/or audio output interfaces, or any other type of device capable of generating tactile, audio, video, or other output. Output devices 412 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 420 may include a presence-sensitive display that may serve as a user interface device that operates both as one or more input devices 408 and one or more output devices 412.

One or more communication units 410 of computing system 420 may communicate with devices external to computing system 420 (or among separate computing devices of computing system 420) by transmitting and/or receiving data, and may operate, in some aspects, as both an input device and an output device. In some examples, communication units 410 may communicate with other devices over a network. In other examples, communication units 410 may send and/or receive radio signals on a radio network such as a cellular radio network. Examples of communication units 410 include a network interface card (e.g., an Ethernet card), an optical transceiver, a radio frequency transceiver, a GPS receiver, or any other type of device that can send and/or receive information. Other examples of communication units 410 may include Bluetooth®, GPS, 3G, 4G, and Wi-Fi® radios found in mobile devices as well as Universal Serial Bus (USB) controllers and the like.

Input devices 408 or communication units 410 may receive multimodal data 116. Inference model 110 may be used to generate predicted outputs. Computation engine 422 executes and applies machine learning system 424 to multimodal data 116 to generate predicted outputs in the form of detected anomaly data 122. Output devices 412 or communication units 410 outputs detected anomaly data 122, which may contain one or more received new observation that are outliers with respect to "normal" data.

Although described as being implemented using neural networks in the example of FIG. 4, machine learning system 424 may also or alternatively apply other types of machine learning to train one or more models. For example, machine learning system 424 may apply one or more of nearest neighbor, naïve Bayes, decision trees, linear regression, support vector machines, neural networks, k-Means clustering, temporal difference, deep adversarial networks, or other supervised, unsupervised, or semi-supervised learning algorithms to train one or more models for prediction.

Figure 5:
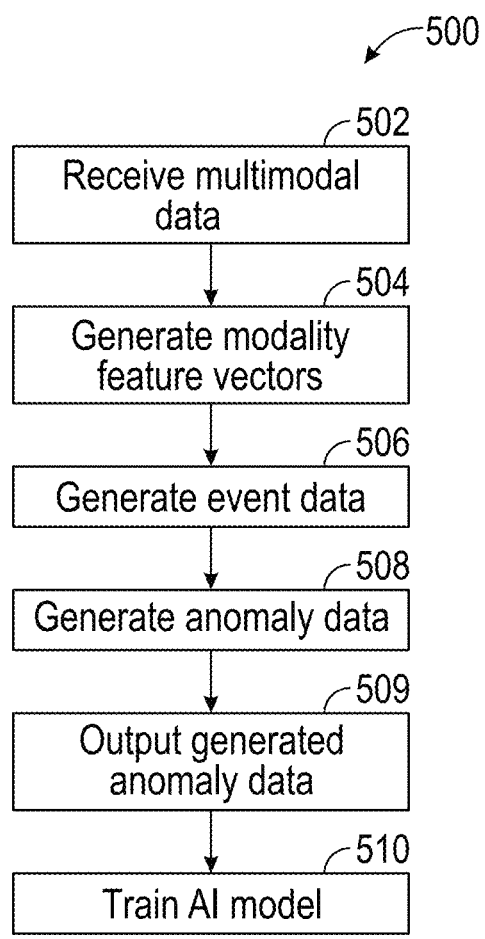
FIG. 5 is a flowchart illustrating an example mode of operation for a machine learning system, according to techniques described in this disclosure.

FIG. 5 is a flowchart illustrating an example mode of operation for a machine learning system, according to techniques described in this disclosure. Although described with respect to computing system 420 of FIG. 4 having a computation engine 422 that executes machine learning system 424, mode of operation 500 may be performed by a computation system with respect to other examples of machine learning systems described herein.

In mode of operation 500, computation engine 422 executes machine learning system 424. Data processing module 106 of the machine learning system 424 may receive multimodal data 116 (502). For each content of a plurality of content of multimodal data, machine learning system 424 may generate, using a first machine learning model (i.e., data processing model 106), a corresponding modality feature vector representative of the data (504). Machine learning system 424 may next process each of the generated modality feature vectors with a second machine learning model (i.e., AI model 108) having an encoder model to generate event data comprising at least one of an event or an activity of interest (506). As noted above, AI model 108 may have an auto-encoder architecture. An autoencoder architecture includes two parts, an encoder and a decoder. An independent encoder learns the optimal representation of data from a source modality, under the form of a latent space, and an independent decoder, uses the latent space to generate a synthetic image (or segmentation).

Machine learning system 424 may process, e.g., using inference model 110, the event data 118 to generate anomaly data 122 indicative of detected anomalies in the multimodal data 116 (508). Inference model 110 may determine a distance of the new observation to the latent variable model, or in other words from the latent variable approximation. Based on the determined distance, inference model 110 may make a determination as to whether or not the new observation is an outlier (anomaly). Machine learning system 524 may output the generated anomaly data 122 (509). For example, machine learning system 524 may output the generation anomaly data 122 to a display device for display to a user, to another application or system for analysis or other processing, or to a storage device.

The machine learning system 524 may optionally train AI model 108 using generated anomaly data 122 (510). The training of AI model 108 may be semi-supervised, utilizing unlabeled data of in-distribution class and adversarial examples together with labeled ones. As shown in FIG. 2, training may use information stored in knowledge container 120.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in computer-readable media, such as a computer-readable storage medium, containing instructions. Instructions embedded or encoded in one or more computer-readable storage mediums may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
processing, by a computing system, using a first machine learning model, first content of multimodal data to generate a first modality feature vector representative of the first content, wherein the multimodal data comprises multidimensional spectral data comprising multi-resolution data in both space and time, and wherein the first content has a first modality and the first modality feature vector has the first modality;
processing, by the computing system, using the first machine learning model, second content of the multimodal data to generate a second modality feature vector representative of the second content, wherein the second content has a second modality and the second modality feature vector has the second modality, wherein the first modality is different than the second modality;
processing, by the computing system, using a second machine learning model, the first modality feature vector and the second modality feature vector to generate event data comprising at least one of an event or an activity of interest; and
processing, by the computing system, the event data to generate anomaly data indicative of detected anomalies in the multimodal data.

2. The method of claim 1, further comprising:
training, by the computing system, the second machine learning model using the generated anomaly data.

3. The method of claim 1, wherein the multimodal data comprises sensor data generated by one or more night vision sensors.

4. The method of claim 3, wherein the one or more night vision sensors comprise at least one of a Short-Wave InfraRed (SWIR) sensor, Medium-Wave InfraRed (MWIR) sensor, Long-Wave InfraRed (LWIR) sensor, and a Near Infrared (NIR) sensor.

5. The method of claim 1, wherein the second machine learning model comprises a transformer model.

6. The method of claim 5,
wherein an intermediate layer of the transformer model comprises N transformer layers, and
wherein each of the N transformer layers comprises an attention mechanism module.

7. The method of claim 5, wherein the transformer model comprises a joint spatiotemporal model encompassing a plurality of spatial resolutions and a plurality of temporal resolutions.

8. The method of claim 1, wherein analyzing the event data to generate anomaly data further comprises analyzing the event data using a domain knowledge model.

9. The method of claim 1, wherein the first modality feature vector comprises an embedding for the first modality and the second modality feature vector comprises an embedding for the second modality.

10. A computing system comprising:
an input device configured to receive multimodal data;
processing circuitry and memory for executing a machine learning system,
wherein the machine learning system is configured to:
process, using a first machine learning model, first content of the multimodal data to generate a first modality feature vector representative of the first content wherein the multimodal data comprises multidimensional spectral data comprising multi-resolution data in both space and time, and wherein the first content has a first modality and the first modality feature vector has the first modality;
process, using the first machine learning model, second content of the multimodal data to generate a second modality feature vector representative of the second content, wherein the second content has a second modality and the second modality feature vector has the second modality, wherein the first modality is different than the second modality;
process using a second machine learning model, the first modality feature vector and the second modality feature vector to generate event data comprising at least one of an event or an activity of interest and process the event data to generate anomaly data indicative of detected anomalies in the multimodal data; and
an output device configured to output the generated anomaly data.

11. The computing system of claim 10,
wherein the machine learning system is further configured to train the second machine learning model using the generated anomaly data.

12. The computing system of claim 10, wherein the multimodal data comprises sensor data generated by one or more night vision sensors.

13. The computing system of claim 12, wherein the one or more night vision sensors comprise at least one of a Short-Wave InfraRed (SWIR) sensor, Medium-Wave InfraRed (MWIR) sensor, Long-Wave InfraRed (LWIR) sensor, and a Near Infrared (NIR) sensor.

14. The computing system of claim 10, wherein the second machine learning model comprises a transformer model.

15. The computing system of claim 14,
wherein an intermediate layer of the transformer model comprises N transformer layers, and
wherein each of the N transformer layers comprises an attention mechanism module.

16. Non-transitory computer-readable media comprising machine readable instructions for configuring processing circuitry to:
process, using a first machine learning model, first content of multimodal data to generate a first modality feature vector representative of the first content, wherein the multimodal data comprises multidimensional spectral data comprising multi-resolution data in both space and time, and wherein the first content has a first modality and the first modality feature vector has the first modality;

process, using the first machine learning model, second content of the multimodal data to generate a second modality feature vector representative of the second content, wherein the second content has a second modality and the second modality feature vector has the second modality, wherein the first modality is different than the second modality;

process, using a second machine learning model comprising an encoder model, the first modality feature vector and the second modality feature vector to generate event data comprising at least one of an event or an activity of interest; and process the event data to generate anomaly data indicative of detected anomalies in the multimodal data.

* * * * *